May 9, 1944. J. A. STEVENS 2,348,662
FISHHOOK EXTRACTOR
Filed March 14, 1942
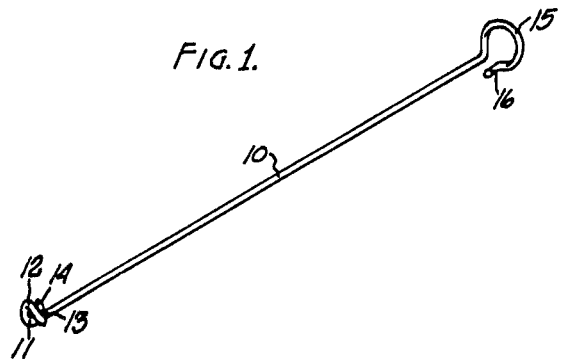
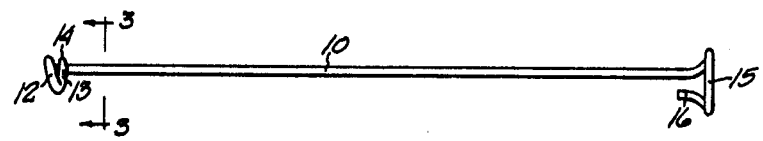
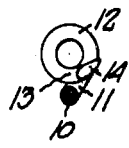
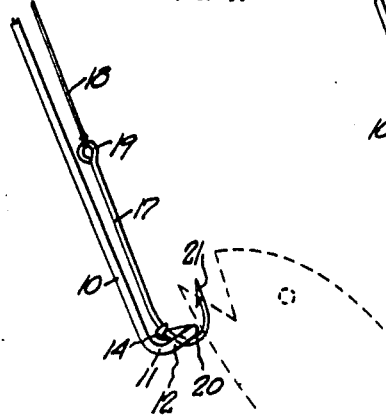
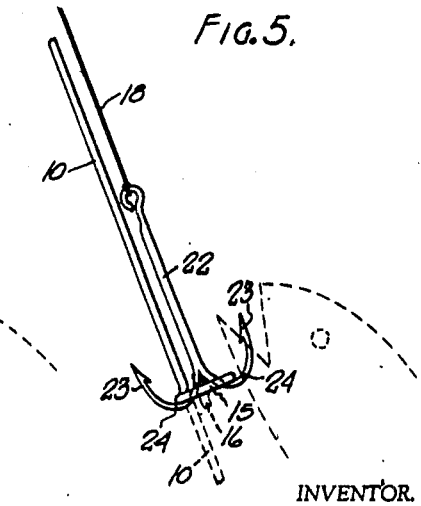
INVENTOR.
JOHN ARTHUR STEVENS.
BY Oltsch & Knoblock
Attorneys Patented May 9, 1944

2,348,662

UNITED STATES PATENT OFFICE 2,348,662

FISHHOOK EXTRACTOR

John Arthur Stevens, South Bend, Ind.

Application March 14, 1942, Serial No. 434,647

2 Claims. (Cl. 43—30)

This invention relates to improvements in fishhook extractors. Various devices of this character have been made heretofore. Most of these have utilized means for prying or dislodging the hook by manipulation of the extractor per se. Some have also been constructed to permit the user to hold a fishhook stationary to permit manual manipulation of the fish to disengage it from the hook. In most of the latter cases, however, I have found that the construction has been such that the extractor tends to slide off of the hook by virtue of the absence of provision therein to effectively retain the extractor locked on the hook.

In my device, I provide a portion adapted to engage the hook and so constructed that the extractor and the hook cannot be disengaged or separated incident to the application of pressure exerted by the extractor upon the hook, so that the hook may be firmly held while the fish is being handled and slid from or pulled from the hook.

The primary object of this invention is to provide a simple device by means of which a fishhook may be easily engaged, retained and manipulated without endangering the fingers of the user on the prongs of the hook.

A further object is to provide a simple, inexpensive, durable and effective device of this character.

A further object is to provide a device which can be used with their single or multiple prong hooks.

Other objects will be apparent from the drawing, description, and appended claims.

In the drawing:

Fig. 1 is a perspective view of the device.

Fig. 2 is a view of the device in side elevation.

Fig. 3 is a transverse sectional view of the device taken on line 3—3 of Fig. 2.

Fig. 4 is a view illustrating the manner in which the device may engage a hook of the single prong type.

Fig. 5 is a view illustrating the manner in which the device may be used to engage a multiple prong hook.

Referring to the drawing, which illustrates the preferred embodiment of the invention, the numeral 10 designates an elongated shank formed of rigid wire or bar stock. At one of its ends, the shank 10 is bent substantially perpendicularly at 11, and at the outer end of the portion 11 is formed a helical eye 12 comprising slightly more than one helix. The wire that forms the helix extends anticlockwise when viewed from the side on which the shank 10 is positioned. The terminal portion 13 is positioned alongside of, but spaced from, the shank. The axis of the eye 12 extends substantially parallel to the shank and is spaced from the shank a distance greater than the outer radius of the helix, whereby the terminal portion 13 is positioned between the shank 10 and said axis. The end of the terminal portion 13 is tapered at 14 to provide a smooth surface throughout and thereby prevent snagging or cutting of a fishline as it engages said terminal portion 14.

At the opposite end of the shank 10 is formed a loop 15 extending in a plane substantially perpendicular to the shank 10 and slightly less than 360° in extent. The terminal portion 16 of the loop 15 extends in slightly spaced parallel relation to the shank 10 and in the same direction from the loop 15 as said shank 10.

In use, assuming that a single prong hook 17 is mounted on the fishing line 18, the shank 10 will be brought to bear against the line 18 at substantially right angles to said line. Thereupon, the shank will be moved in engagement with the line until the line passes between the shank and the terminal portion 13 of the eye 12 and around the curve 11. Thereupon, the extractor will be moved into substantially parallel relation with the line 18 so that the line 18 will be received within the helical eye 12. The inner diameter of the helical eye 12 is preferably larger than the diameter of the eye 19 of the hook 17 so that the extractor may be downwardly pushed along the line 18 and over or around the eye 19 of the hook and outwardly along the shank of the hook until the helical eye 12 engages the bight 20 of the hook. If the line 18 is then firmly grasped and pulled upon, as by wrapping the line around one finger of the hand in which the extractor is held, the hook 17 may be held in the manner illustrated in Fig. 4, whereupon, the fish may be grasped with the other hand, manipulated, and thus removed from the prong 21 of the hook.

Note, in this connection, that the helical eye 12 is in excess of 360° in extent and also extends reversely, that is, extends from the outer end of the implement back toward the point at which the extractor is grasped by the user. These features insure that the extractor will not slide from the fishhook or become disengaged or separated therefrom. In other words, if the hook is always retained within the eye 12, whose extent is greater than 360° there is no possibility, while the parts are held as illustrated in Fig. 4, that the same will be disengaged.

The use of the device with a hook 22 having multiple prongs 23 is illustrated in Fig. 5. Note, in this construction, that the spacing between the shank 10 and the terminus 16 of the loop 15 is sufficient to permit passage of the shank of the hook 22 between said parts, whereupon, the loop 15 may be brought to bear equally upon the bights 24 of the individual prongs of the hook, while the line 18 and the shank 10 of the extractor are held by the user, as in the full line positions. Also, if desired, the device may be used with the shank 10 positioned as illustrated in dotted lines in Fig. 5, extending away from the hook instead of alongside the hook shank. In either case, it is possible, by manipulating the extractor, to hold the multiple prong hook in desired position and thereby be able to manipulate the fish in a manner to remove the same from the hook without danger of pricking the fingers upon the prongs of the hook. It will be observed that the extension of the eyes or loops 12 and 15 at an angle to the shank 10 with their terminal portions 14 and 16, respectively extending in an inward direction with respect to the outer end of the extractor, permits either thereof to be pressed against the palm of the hand while the fingers grasp the shank, to facilitate application of pressure to the extractor and also to facilitate handling of the extractor when the hands of the user are wet or are otherwise slippery as by virtue of previous engagement with the oily substance normally encountered when fish are touched.

I claim:

1. A fishhook extractor comprising an elongated rigid shank, and a helical portion comprising slightly more than one helix, and extending back alongside said shank about an axis substantially parallel to said shank and spaced from said shank a distance greater than the radius of the outer surface of said helical portion.

2. A fishhook extractor comprising an elongated rigid shank and a line receiving eye projecting laterally from one end of said shank, said eye being helical and comprising slightly more than one helix extending anticlockwise when viewed from the side on which said shank is positioned and extending alongside said shank with its end portion spaced from said shank and positioned between said shank and the axis of said eye.

JOHN ARTHUR STEVENS.